United States Patent [19]

Eno

[11] Patent Number: 5,422,969

[45] Date of Patent: Jun. 6, 1995

[54] OPTICAL SWITCH

[75] Inventor: Robert A. Eno, Plymouth, Minn.

[73] Assignee: ADC Telecommunications, Inc., Minneapolis, Minn.

[21] Appl. No.: 742,211

[22] Filed: Aug. 6, 1991

Related U.S. Application Data

[63] Continuation of Ser. No. 611,323, Nov. 13, 1990, abandoned, which is a continuation of Ser. No. 300,205, Jan. 19, 1989, abandoned, which is a continuation-in-part of Ser. No. 191,014, May 6, 1988, abandoned.

[51] Int. Cl.[6] ............................................. G02B 6/40
[52] U.S. Cl. ...................................................... 385/54
[58] Field of Search .......................... 350/96.20, 96.22

[56] References Cited

U.S. PATENT DOCUMENTS

| | | | |
|---|---|---|---|
| 3,703,344 | 11/1972 | Tew | 418/61 |
| 3,936,143 | 2/1976 | Sato | |
| 4,023,887 | 5/1977 | Speers | 350/96 |
| 4,033,669 | 7/1977 | Hanson | 350/96 |
| 4,047,796 | 9/1977 | Kao et al. | 350/96 |
| 4,088,387 | 5/1978 | Lewis | 350/96.15 |
| 4,090,778 | 5/1978 | Phillips et al. | 350/96.20 |
| 4,099,832 | 7/1978 | Warmer, Jr. | 350/96.21 |

(List continued on next page.)

FOREIGN PATENT DOCUMENTS

| | | | |
|---|---|---|---|
| 9141 | 8/1979 | European Pat. Off. | |
| 2291508 | 11/1974 | France | |
| 2291509 | 11/1974 | France | |
| 2291510 | 11/1974 | France | |
| 2500936 | 2/1981 | France | |
| 2501382 | 3/1981 | France | |
| 1137729 | 6/1965 | Germany | 418/63 |
| 3104155 | 12/1981 | Germany | |
| 50-3106 | 11/1979 | Japan | 260/424 |
| 57-44106A | 3/1982 | Japan | |
| 1486764 | 9/1977 | United Kingdom | |
| 2009439 | 6/1979 | United Kingdom | |
| 2060930 | 9/1980 | United Kingdom | |
| 2145570 | 3/1985 | United Kingdom | |
| WO80/01871 | 9/1980 | WIPO | |

OTHER PUBLICATIONS

AT&T Launches Fiber Products, *Communications Week*, Monday, Mar. 10, 1986.
Bypass Switch, *Laser Focus/Electro-Optics*, May 1986.
Routing and Bypass Switches, *Lightwave*, Aug. 1986.
Fiber-optic bypass switch improves network reliability, *Design News*, Jan. 10, 1983.
Conrad et al., Fiber Optic Switch, IBM Technical Disclosure Bulletin, vol. 20, No. 3, Aug., 1977.
Kovach, et al, "Simple Precision RC Oscillator," IBM Tech. Disclosure Bulletin, vol. 16, No. 10, Mar. 1974–pp. 3174–3175.

*Primary Examiner*—Rodney B. Bovernick
*Assistant Examiner*—Robert E. Wise
*Attorney, Agent, or Firm*—Merchant, Gould, Smith, Edell, Welter & Schmidt

[57] ABSTRACT

An optical switch is disclosed for a system including signals carried over a plurality of optical fibers. The switch comprises a first and second plurality of optical fibers with each of the fibers terminating at a terminal end. A first switch body is provided for holding fibers of the first plurality in a closely packed array with terminal ends disposed circumferentially about a common first axis. A second switch body is provided for holding fibers of the second plurality in a second array. The first and second arrays are selected for at least a portion of terminal ends of the fibers of the first plurality to be optically coupled with terminal ends of at least one of the fibers of the second plurality when the first array is angularly displaced about the first axis in any one of a plurality of angularly displaced positions. The arrays are further selected for at least one of the fibers of the first array to be optically coupled with different fibers of the second array when the first array is disposed in any one of at least two of the angularly displaced positions. An alignment mechanism is provided for aligning the first array with the second array and with the first array moveable to any of the plurality of angularly displaced positions.

30 Claims, 3 Drawing Sheets

U.S. PATENT DOCUMENTS

| | | | |
|---|---|---|---|
| 4,109,994 | 8/1978 | Chown | 350/96.21 |
| 4,123,139 | 10/1978 | Sandahl | 305/96.21 |
| 4,124,272 | 11/1978 | Henderson et al. | 350/96.21 |
| 4,132,461 | 1/1979 | Jacques et al. | 350/96.20 |
| 4,147,405 | 4/1979 | Spainhour | 350/96.21 |
| 4,161,347 | 7/1979 | Tardy | 350/96.21 |
| 4,189,206 | 2/1980 | Terai et al. | 350/96.20 |
| 4,193,662 | 3/1980 | Hara | 350/96.15 |
| 4,193,665 | 3/1980 | Arnold | 350/96.22 |
| 4,204,742 | 5/1980 | Johnson et al. | 350/96.20 |
| 4,204,744 | 5/1980 | Wittmann | 350/96.20 |
| 4,205,896 | 6/1980 | Borsuk | 350/96.20 |
| 4,208,094 | 6/1980 | Tomlinson, III et al. | 350/96.20 |
| 4,220,396 | 9/1980 | Antell | 350/96.15 |
| 4,223,978 | 9/1980 | Kummer et al. | 350/96.20 |
| 4,229,068 | 10/1980 | Hodge et al. | 350/96.20 |
| 4,239,331 | 12/1980 | Aoyama | 350/96.20 |
| 4,245,885 | 1/1981 | Hodge | 350/96.20 |
| 4,245,886 | 1/1981 | Kolodzey et al. | 350/96.20 |
| 4,261,638 | 4/1981 | Wagner | 350/96.15 |
| 4,265,513 | 5/1981 | Matsushita et al. | 350/96.20 |
| 4,277,135 | 7/1981 | Schrott et al. | 350/96.21 |
| 4,303,302 | 12/1981 | Ramsey et al. | 350/96.20 |
| 4,303,303 | 12/1981 | Aoyama | 350/96.20 |
| 4,304,460 | 12/1981 | Anaka et al. | 350/96.16 |
| 4,318,587 | 3/1982 | Grassl | 350/96.20 |
| 4,322,126 | 3/1982 | Minowa et al. | 350/96.20 |
| 4,337,995 | 7/1982 | Tanaka et al. | 350/96.20 |
| 4,361,380 | 11/1982 | Marazzi | 350/96.21 |
| 4,376,566 | 3/1983 | Blackington | 350/96.2 |
| 4,378,144 | 3/1983 | Duck et al. | 350/96.18 |
| 4,379,614 | 4/1983 | Liertz | 350/96.21 |
| 4,401,365 | 8/1983 | Mizokawa et al. | 350/96.20 |
| 4,407,562 | 10/1983 | Young | 350/96.20 |
| 4,410,929 | 10/1983 | Feinbloom et al. | 362/32 |
| 4,415,228 | 11/1983 | Stanley | 350/96.20 |
| 4,415,229 | 11/1983 | McCullough | 350/96.20 |
| 4,436,367 | 3/1984 | Lewis et al. | 350/96.20 |
| 4,437,728 | 3/1984 | Ohashi | 350/96.20 |
| 4,441,785 | 4/1984 | Petrozello | 350/96.20 |
| 4,445,752 | 5/1984 | Faber et al. | 350/96.20 |
| 4,447,114 | 5/1984 | Koene | 350/96.2 |
| 4,448,480 | 5/1984 | Witte | 350/96.15 |
| 4,448,482 | 5/1984 | Lathlaen | 350/96.21 |
| 4,452,507 | 6/1984 | Winzer | 350/96.20 |
| 4,460,242 | 7/1984 | Birch et al. | 350/96.20 |
| 4,484,793 | 11/1984 | Laude | 350/96.20 |
| 4,498,730 | 2/1985 | Tanaka et al. | 350/96.16 |
| 4,502,754 | 3/1985 | Kawa | 350/96.20 |
| 4,512,627 | 4/1985 | Archer et al. | 350/96.20 |
| 4,514,034 | 4/1985 | Bruch | 350/96.20 |
| 4,515,433 | 5/1985 | Schmidt | 350/96.21 |
| 4,516,837 | 5/1985 | Soret et al. | 350/347 V |
| 4,519,672 | 5/1985 | Rogstadius | 350/96.20 |
| 4,525,025 | 6/1985 | Hohmann et al. | 350/96.15 |
| 4,526,438 | 7/1985 | Essert | 350/96.20 |
| 4,529,265 | 7/1985 | Toya et al. | 350/96.21 |
| 4,530,567 | 7/1985 | Simon | 350/96.20 |
| 4,537,468 | 8/1985 | Degoix et al. | 350/96.21 |
| 4,541,685 | 9/1985 | Anderson | 350/96.21 |
| 4,544,234 | 10/1985 | De Vau, Jr. et al. | 350/96.21 |
| 4,545,644 | 10/1985 | De Veau, Jr. et al. | 350/96.21 |
| 4,556,282 | 12/1985 | Delbecque | 350/96.21 |
| 4,557,555 | 12/1985 | Stoerk et al. | 350/96.20 |
| 4,560,234 | 12/1985 | Shaw et al. | 350/96.15 |
| 4,568,143 | 2/1986 | Yamada et al. | 350/96.20 |
| 4,568,145 | 2/1986 | Colin et al. | 350/96.20 |
| 4,580,873 | 4/1986 | Levinson | 350/96.20 |
| 4,580,874 | 4/1986 | Winter et al. | 350/96.21 |
| 4,582,391 | 4/1986 | Legrand | 350/96.20 |
| 4,585,301 | 4/1986 | Bialkowski | 350/96.20 |
| 4,585,304 | 4/1980 | Winter et al. | 350/96.21 |
| 4,589,726 | 5/1986 | Buhrer | 350/96.20 |
| 4,593,971 | 6/1986 | Clement et al. | 350/96.20 |
| 4,607,910 | 8/1986 | Thurenius | 350/96.20 |
| 4,610,504 | 9/1986 | Thurenius et al. | 350/96.20 |
| 4,611,885 | 9/1986 | Boirat | 350/96.20 |
| 4,636,034 | 1/1987 | Kashimura et al. | 350/96.21 |
| 4,641,915 | 2/1987 | Asakawa et al. | 350/96.18 |
| 4,643,521 | 2/1987 | Harstead et al. | 350/96.20 |
| 4,650,277 | 3/1987 | Husher et al. | 350/96.20 |
| 4,653,849 | 3/1987 | Boirat | 350/96.22 |
| 4,653,850 | 3/1987 | Boirat et al. | 350/96.22 |
| 4,657,338 | 4/1987 | Khoe et al. | 350/96.210 |
| 4,657,339 | 4/1987 | Fick | 350/96.20 |
| 4,657,343 | 4/1987 | Oldham et al. | 350/96.23 |
| 4,659,175 | 4/1987 | Wilde | 350/96.20 |
| 4,664,732 | 5/1987 | Campbelle et al. | 156/158 |
| 4,674,831 | 6/1987 | Bagby | 350/96.20 |
| 4,681,397 | 7/1987 | Bhatt | 350/96.20 |
| 4,685,765 | 8/1987 | Daly et al. | 350/96.21 |
| 4,688,885 | 8/1987 | Poteat et al. | 350/96.20 |
| 4,699,457 | 10/1987 | Goodman | 350/96.20 |
| 4,708,433 | 11/1987 | Kakii et al. | 350/96.22 |
| 4,709,981 | 12/1987 | Mori | 350/96.21 |
| 4,712,864 | 12/1987 | Ellis et al. | 350/96.22 |
| 4,715,673 | 12/1987 | Noro et al. | 350/96.20 |
| 4,718,745 | 1/1988 | Strait, Jr. | 350/96.21 |
| 4,753,501 | 6/1988 | Battle | 350/96.20 |
| 4,834,488 | 5/1989 | Lee | 350/96.20 |
| 4,896,935 | 1/1990 | Lee | 350/96.20 |
| 4,946,247 | 8/1990 | Muska et al. | 350/96.20 |
| 4,989,946 | 2/1991 | Williams et al. | |

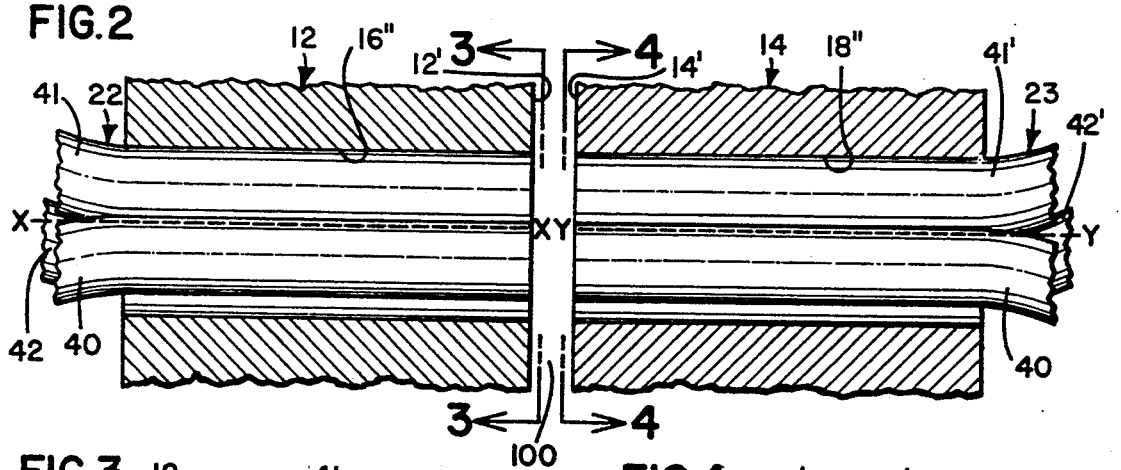
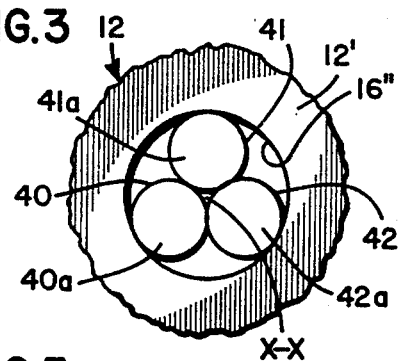
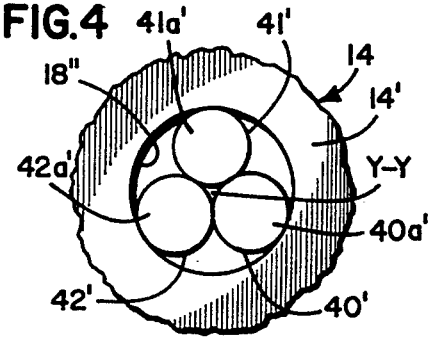
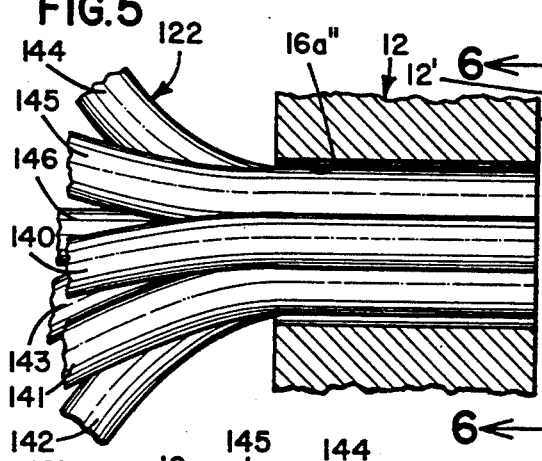
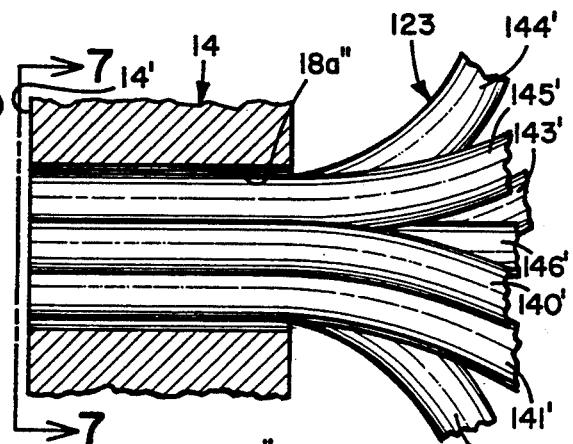
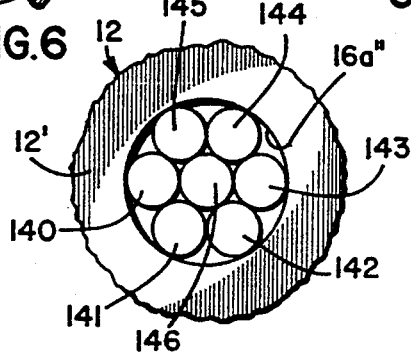
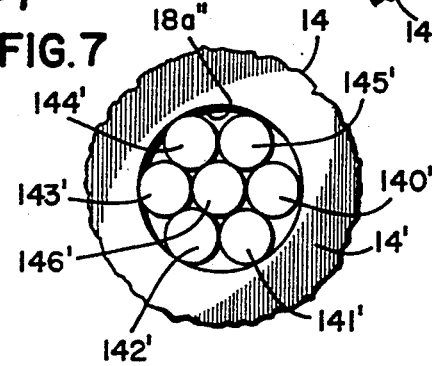

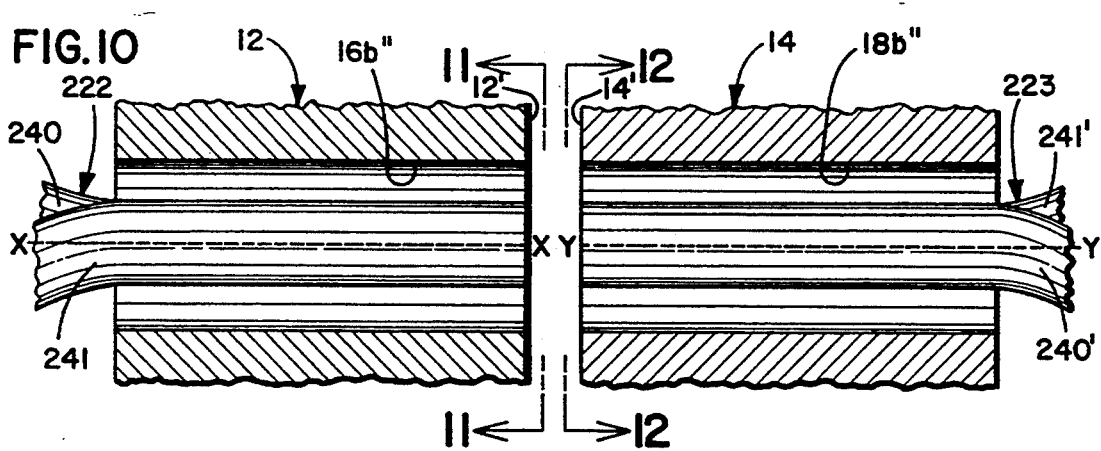
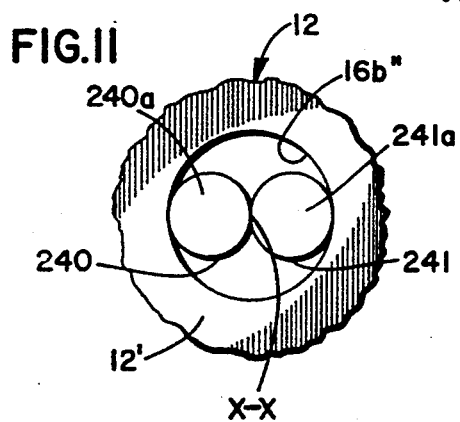
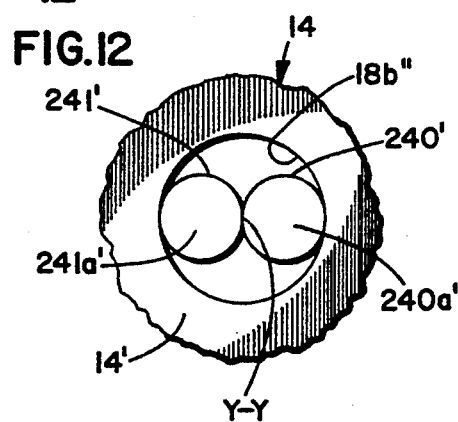
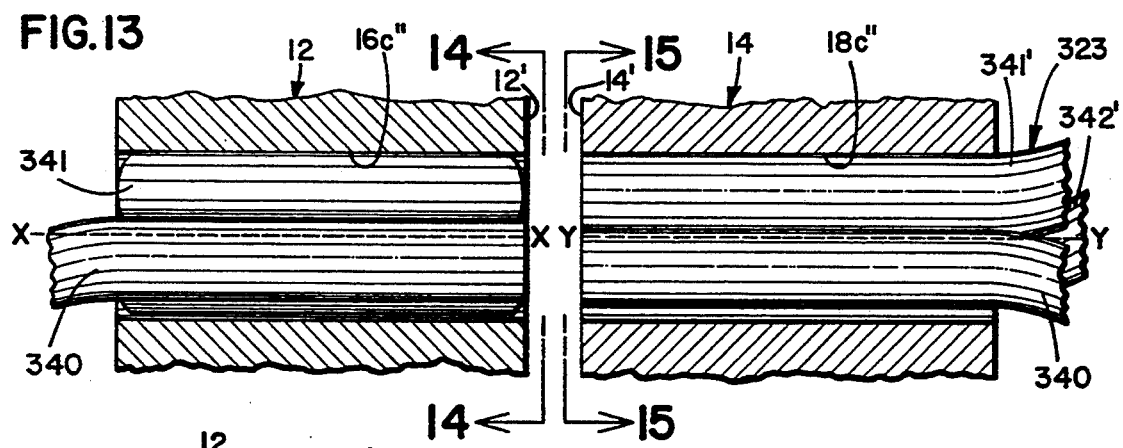
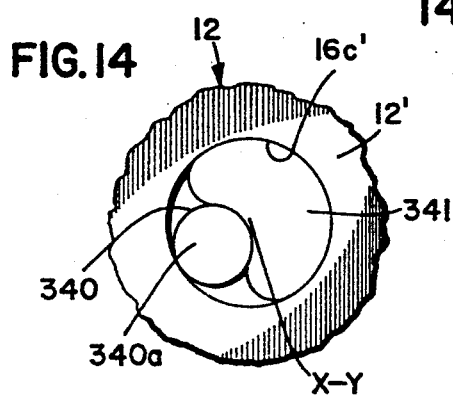
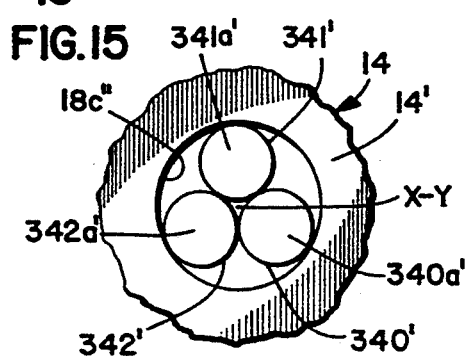

OPTICAL SWITCH

This is a continuation of application Ser. No. 07/611,323 filed Nov. 13, 1990 now abandoned (continuation of Ser. No. 07/300,205 filed Jan. 19, 1989 now abandoned which is a continuation-in-part of Ser. No. 07/191,014 filed May 6, 1988), and now abandoned.

BACKGROUND OF THE INVENTION

1. Field of the Invention

This invention pertains to optical fiber connectors. More particularly, this invention pertains to means for connecting a plurality of optical fibers with means for switching optical couplings between the fibers.

2. Description of the Art

In the communications industry, the use of optical fibers for signal transmission is well known. While optical fibers present numerous advantages to conventional signal transmission, unique problems are associated with optical fiber transmission systems. For example, optical fibers having extremely small diameters require very precise alignment to avoid transmission and power losses. As a result, mechanical devices previously known in the prior art for terminating or switching conductors are not generally suitable for use with optical fibers.

To meet growing demand for optical fiber systems, the art has developed connectors and switches for use with optical fibers. An example of such a connector is described in a publication entitled "ST Series Multi-Mode Fiber Optic Connectors, Light Guide Apparatus Data Sheet," produced by AT&T Technologies, Inc. and bearing copyright date of 1985. The connector of the AT&T publication includes a ceramic plug which receives and retains an optical fiber. The plug is held in a flexible split-sleeve coupler. A similar plug with an optical fiber is inserted into the split-sleeve coupling with the sleeve holding the plugs in axial alignment and with the opposing fibers being optically coupled. The apparatus of the AT&T publication is not a switch per se in that it does not provide means for selectively changing optical couplings between choices of pairs of optical fibers.

An optical fiber switch is shown and described in a publication entitled "Electro-Optic Products 'Moving Fiber' Switches Permit Greater System Predictability and Reliability" published by Siecor Corporation. The Siecor Switch shows lateral shifting of optic fibers.

Another example of an optical switch is shown in U.S. Pat. No. 4,033,669 to Hanson dated Jul. 5, 1977. In Hanson, a plurality of parallel rods retain and align a plurality of fibers. The fibers (such as elements 23, 25, and 27 in FIG. 3 of Hanson) are maintained in the interstice defined by opposing surfaces of rods (such as rods 24a–24e in FIG. 3 of Hanson). As more fully described in the text of the Hanson patent, alignment of certain rods and movement of the rods affects alignment and switching of the optical fibers.

Optical fiber switches are also shown and described in U.S. Pat. Nos. 4,245,885 and 4,229,068. Both patents are assigned to T.R.W., Inc. of Cleveland, Ohio, and show a structure where a plurality of rods define a plurality of interstitial channels into which optical fibers are placed.

In U.S. Pat. No. 4,245,885, optical fibers 24 are shown positioned within interstitial channels 76, 78, 80, 82, 84, and 86. In U.S. Pat. No. 4,229,068, the optical fibers are shown in FIG. 3 as items 93, 95, 97, 99, 101, 103, 105, and 107. The fibers are shown in the interstitial spaces defined between a common central rod 6 and a plurality of circumferential rods 91. An alternative embodiment is shown in FIG. 6 of U.S. Pat. No. 4,229,068 where the optical fibers 176 are provided within the interstitial channels defined between circumferential rods 174 and an outer sleeve 178. In U.S. Pat. Nos. 4,245,885 and 4,229,068, switching between optical fibers is accomplished by rotating the fiber arrays about a common axis.

Notwithstanding the aforesaid prior art couplers and switches, there is a continuing need for enhanced design of optical fiber couplers and switches. This need arises from the high cost associated with many prior art design. Optical fiber switches and couplers need to be mass produced in a manner which will have low manufacturing costs yet permit high performance of a finished product. Performance of optical switches is severely debilitated where a switch cannot align opposing optical fibers within prescribed tolerance limits. Also, it is desirable that a design will permit use of optic coupling enhancement techniques (such as use of index matching fluids) to improve optical performance.

The need for high tolerances in optical alignment is best understood with reference to the small dimensions involved in optical fibers. For example, a single mode optical fiber may have an outside diameter of 125 microns with an optic core having a diameter of about 10 microns.

In order to provide high performance optical coupling between opposing fibers, the cores of the fibers must be in opposing coaxial alignment with a high degree of tolerance. For example, where the axis of opposing optical fibers are offset by one micron, the one micron misalignment represents about 1 dB. In assessing the performance impact, 3 dB is approximately equivalent to a 50 percent power loss. It is generally recognized that misalignments in excess of 3 microns are not acceptable. Heretofore, switch designs which can meet this high degree of tolerance yet retain generally low manufacturing costs have been elusive.

SUMMARY OF THE INVENTION

According to a preferred embodiment of the present invention, an optical switch is provided for a system having signals carried over a plurality of optical fibers. The switch includes a first and second plurality of optical fibers with each of the fibers terminating at a terminal end. A first switch body is provided for holding the fibers of the first plurality in a closely packed first array with the terminal ends disposed circumferencially about a common first axis. A second switch body is provided for holding the fibers of the second plurality in a second array. The first and second arrays are selected for at least a portion of the terminal ends of the fibers of the first plurality to be optically coupled with terminal ends of at least one of the fibers of the second plurality when the first array is angularly displaced about the first axis in any one of a plurality of angularly displaced positions. Further, at least one of the fibers of the first array is optically coupled with different fibers of the second array when the first array is disposed in any one of at least two of the angularly displaced positions. An alignment mechanism is provided for aligning the first array with the second array and with the first array moveable to any of the plurality of angularly displaced positions.

DESCRIPTION OF THE DRAWINGS

FIG. 2 is an enlarged view of opposing fiber arrays of a switch of the present invention;

FIG. 3 is a view taken along line 3—3 of FIG. 2;

FIG. 4 is a view taken along line 4—4 of FIG. 2;

FIG. 5 is a view similar to FIG. 2 showing an alternative embodiment of the present invention;

FIG. 6 is a view taken along line 6—6 of FIG. 5;

FIG. 7 is a view taken along line 7—7 of FIG. 5;

FIG. 10 is a view similar to FIGS. 2 and 5 showing an alternative embodiment of the present invention;

FIG. 11 is a view taken along line 11—11 of FIG. 10; and

FIG. 12 is a view taken along line 12—12 of FIG. 10;

FIG. 13 is a view similar to FIGS. 2, 5 and 10 showing yet another alternative embodiment of the present invention;

FIG. 14 is a view taken along line 14—14 of FIG. 13; and

FIG. 15 is a view taken along line 15—15 of FIG. 13.

DESCRIPTION OF THE PREFERRED EMBODIMENT

Figure 1:
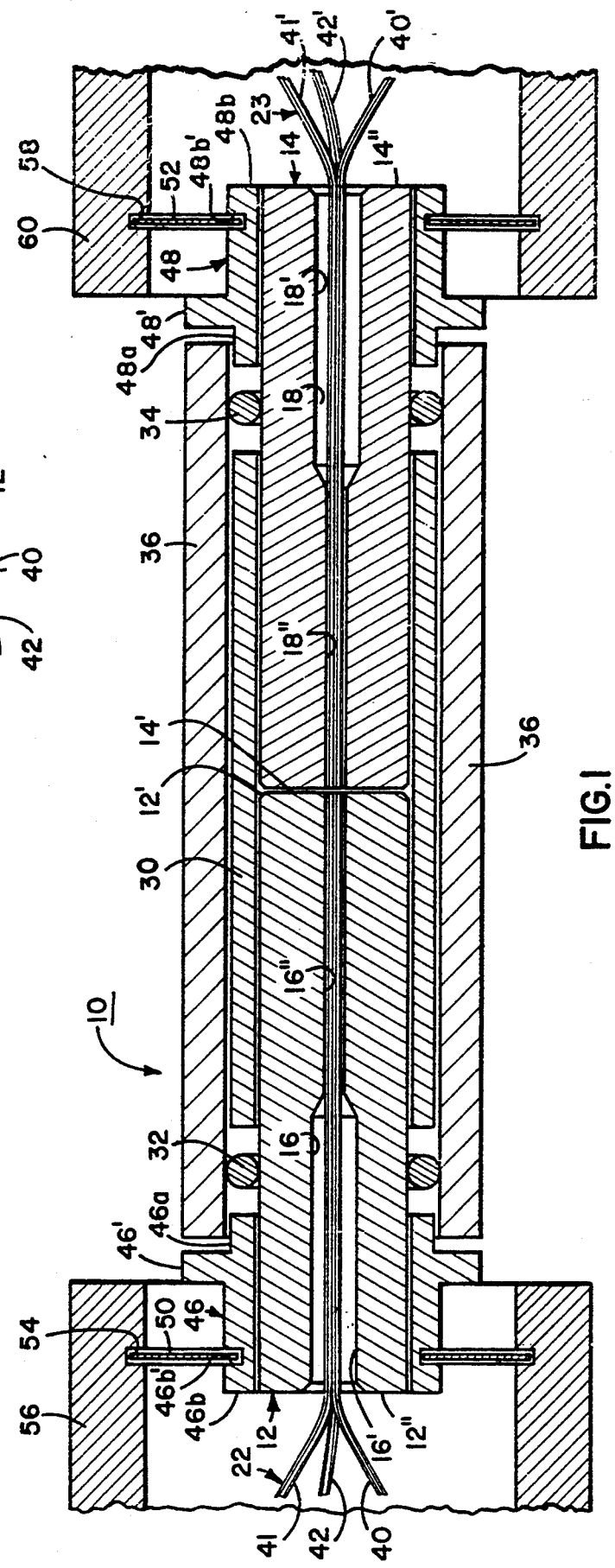
FIG. 1 is a cross-sectional plan view of an optical switch according to the present invention.

Referring now to the several drawing figures in which identical elements are numbered identically throughout, a description of the preferred embodiment of the present invention will now be presented with reference to optical switch 10. Switch 10 includes a first switch body 12 and a second switch body 14.

Each of the switch bodies 12, 14 is identical and is provided in the form of a ceramic plug of generally cylindrical configuration. Extending axially through bodies 12 and 14 are bores 16 and 18, respectively. Bodies 12 and 14 terminate at terminal axial faces 12' and 14', respectively.

As shown in FIG. 1, bores 16 and 18 include enlarged portions 16', 18' and narrow portions 16", 18". The diameter of bores 16" and 18" are sized, as will be described, to receive, in close tolerance, fiber optic arrays. Bore portion 16' and 18' are enlarged to facilitate admission of optical fibers into the bores 16, 18.

In a first preferred embodiment of the present invention, each of switch bodies 12 and 14 are provided with first and second arrays 22, 23, respectively, of optical fibers. In the preferred embodiment, each of the first and second arrays 22, 23 include three optical fibers.

With reference now to FIGS. 2–4, the optical fiber arrays 22, 23 for the first preferred embodiment will now be described. In FIG. 2, a first array 22 consists of three optical fibers 40, 41, and 42. First array 22 is received within reduced bore portion 16" of first switch body 12. A similar second array 23 of three optical fibers 40', 41' and 42' is shown within reduced bore portion 18" of second switch body 14. In FIG. 2, the distance between opposing switch bodies 12 and 14 is exaggerated.

Shown best in FIGS. 3 and 4, each of arrays 22 and 23 are selected such that the optical fibers 40–42 and 40'–42' are disposed in a closely packed array with each of the fibers in side-by-side abutting relation. In practice, the diameters of optical fibers vary within a predetermined manufacturing tolerance range. The bores 16" and 18" are sized to receive an array of the largest fibers of a predetermined tolerance range. If fibers of smaller diameters (but still within the tolerance range) are inserted, a small gap may be present between opposing fibers. The term "side-by-side abutting relation" as used herein and in any appended claims means opposing fibers are in direct contact or spaced by no more than a gap resulting from variation of fiber diameters within the predetermined tolerance range. To avoid detrimental optical performance, the tolerance range should be selected so that any such gap is less than three microns and preferably less than one micron. This is well within current technology in that optical fibers can be manufactured with outside diameters controlled within plus or minus 0.3 microns to two microns.

As shown, fibers 40–41 terminate at generally planar terminal ends 40a, 41a, and 42a. Similarly, fibers 40'–42' terminate at terminal ends 40a', 41a', 42a'. The terminal ends 40a–41a and 40a'–42a' are generally perpendicular to the longitudinal axes of the optical fibers and to the axes X—X and Y—Y of the switch bodies 12 and 14.

As shown in FIGS. 3 and 4, the optical fibers 40–41 and 40'–41' are disposed with the terminal ends 40a–42a and 40a'–42a' disposed circumferentially about common first and second axes X—X and Y—Y, respectively. Shown in FIG. 5, axis X—X is centrally disposed within the interstice defined by the abutting optical fibers 40–42. Similarly, and as shown in FIG. 4, axes Y—Y is centrally disposed within the interstice defined between opposing surfaces of optical fibers 40'–42'.

Figure 8:
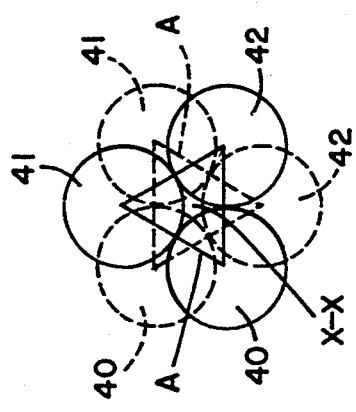
FIG. 8 is a schematic representation showing rotational positioning of optical fibers in a switch of the present invention.

As shown in FIG. 8, the axes of the optical fibers define a triangle A with the common axes, such as axis X—X, centrally disposed within the triangle. In FIG. 8, fibers 40–42 are shown in first positions shown in solid lines and in 60 degree rotated positions shown in phantom lines. The distance from the axis of each optical fiber to the common axis is approximated by the following formula: $d = 2r/3^{\frac{1}{2}}$ where d is the distance from the common axis to the axis of the optical fiber and r is the radius of the optical fiber.

Maintenance of close tolerances with switch bodies 12 and 14 is very important for successful operation of the present invention. In a preferred embodiment (using three optic fibers such as fibers 40–42), the fibers have diameters of about 125 microns. With arrays such as those shown in FIGS. 3 and 4, switch bodies 12 and 14 preferably have inside diameters of 0.269 mm with a tolerance of −0 mm and +0.001 mm. In a preferred embodiment, the switch bodies 12 and 14 will have an outside diameter of 2.5 mm (plus or minus 0.0005 mm) and with a concentricity of the axis of the internal bore to the outside diameter to be within 1 micron. Preferably switch bodies 12 and 14 are ceramic. Ceramic cylindrical bodies having dimensions as described are within the skill of the art of ceramicists and may be available through Kyocera Corp., Japan, as items FCR-2 in its brochure "Fiber Optic Component Parts" bearing copyright date 1988.

Figure 9:
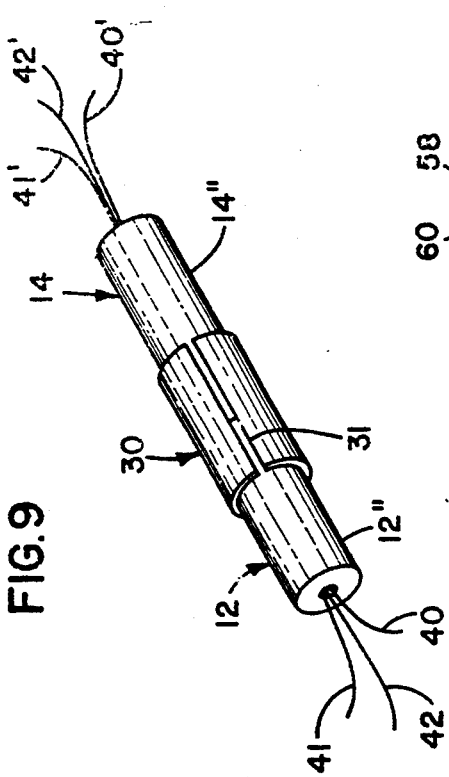
FIG. 9 is a perspective view of the present invention showing switch bodies held by a split sleeve coupler.

With arrays 22 and 23 bonded within switch bodies 12 and 14, respectively, the switch bodies 12 and 14 are maintained in coaxial alignment by means of a sleeve 30. As shown in FIGS. 1 and 9, sleeve 30 surrounds the exterior surface of both switch bodies 12 and 14. Exterior ends 12" and 14" of switch bodies 12 and 14 extend axially away from sleeve 30. Sleeve 30 is preferably a ceramic split sleeve having an axially extending gap 31

(shown in FIG. 9) disposed along the sleeve. An example of such is shown as item TCS-Type in the aforementioned Kyocera bulletin.

With the switch bodies 12 and 14 disposed within sleeve 30 and with faces 12' and 14' opposing one another, axes X—X and Y—Y are in colinear alignment. Further, each of sleeves 12 and 14 is rotatable within sleeve 30 and axially slideable within sleeve 30.

A first O-ring 32 is provided surrounding switch body 12. O-ring 32 opposes sleeve 30. Similarly, a second O-ring 34 is provided surrounding second switch body 14 and opposing sleeve 30. A tube 36, preferably glass or other ceramic material, is provided surrounding sleeve 30 and O-rings 32 and 34. Tube 36 is generally coaxial with sleeve 30 and coaxial with switch bodies 12 and 14. O-rings 32 and 34 are selected to provide liquid tight seal between sleeve bodies 12 and 14, respectively, and tube 36 while accommodating relative axial and rotational movement of switch bodies 12 and 14.

A first packing gland 46 is provided surrounding free end 12" and a second packing gland 48 is provided surrounding free end 14". Packing glands 46 and 48 are bonded to switch bodies 12 and 14, respectively, through any suitable means. Each of packing glands 46 and 48 include radial flanges 46' and 48'. On a side of the radial flanges 46' and 48', each of packing glands 46 and 48 include first cylindrical portions 46a, 48a which extend into the volume defined between opposing surfaces of tube 36 and switch bodies 12 and 14, respectively. Second cylindrical portions 46b and 48b extend away from flanges 46' and 48' on sides thereof opposite tube 36.

Cylindrical portions 46b and 48b are provided with circumferential slots 46b' and 48b' which receive generally circular, flexible diaphragms 50 and 52, respectively. A peripheral edge of diaphragm 50 is received within a slot 54 of a first mount 56. Similarly, a peripheral edge of diaphragm 52 is received within a slot 58 of second mount 60.

Mount 56 may be physically connected to any stationary object or may be connected to a handle. Mount 60 may be similarly connected. For example, if mount 56 is connected to a stationery object and mount 60 is connected to a handle, switch bodies 12 and 14 may be rotated relative to one another by an operator engaging the handle connected to mount 60 and rotating mount 60 about its axis. Diaphragms 50 and 52 permit relative universal movement between mounts 56 and 60 while permitting sleeve 30 and tube 36 to maintain switch bodies 12 and 14 in generally coaxial alignment.

As shown in FIGS. 3 and 4, the arrays 22 and 23 are mirror images. Namely, when the arrays are presented opposing one another in a particular angular alignment, optical fiber face 40a will oppose face 40a'. Likewise, face 41a will oppose face 41a' and face 42a will oppose face 42a'. With the fibers in close opposition, the fibers are optically coupled.

To enhance optical transmission, an index matching fluid is provided within the volume 100 (shown in FIG. 2) between opposing faces 14' and 12'. O-rings 32 and 34 insure the index matching fluid is retained within the switch 10. Alternatively or additionally an anti-reflective coating should be applied to the ends of the fibers. It will be appreciated that index matching fluids and anti-reflective coatings form no part of this invention per se and are commercially available.

With the structure of the present invention as described, the benefits o the invention will now be discussed. Namely, the switch bodies 12 and 14 are rotatable relative to one another to any of a plurality of angularly displaced positions. In one such position, faces 40a, 40a'; 41a, 41a'; and 42, 42a' are optically coupled. By rotating first switch body 12 clockwise (relative to the view of switch body 14 in FIG. 4) 120 degrees an optical switching occurs resulting in fiber pairs 40, 41'; 41, 42' and 42, 40' being optically coupled. Rotation an additional 120 degrees results in fiber pairs 40, 42'; 41, 40' and 42, 40' being optically coupled.

The present invention with its closely packed arrays overcomes inherent problems associated with prior art optical switches. Namely, prior art optical switches required extremely careful construction and operation to assure the high tolerance necessary for coaxial alignment between opposing optical fibers in order to have desired optical coupling. As previously mentioned, optical fibers which were out of axial alignment by as much as 3 microns could suffer a 50 percent power loss which would be unacceptable.

With the structure of the present invention and with the dimensions as described, a 1 degree relative rotation of switch bodies 12 and 14 about axes X—X and Y—Y translates into approximately 1 micron displacement of the axis of the optical fiber. Accordingly, if angular displacement can be controlled to within 1 degree of rotation, axial displacement of the optical fibers can be controlled within about one micron of accuracy. One micron tolerance is very acceptable for optical transmission.

Controlling rotational elements within one degree of angular displacement is well within the skill of mechanical arts. For example, commercially available step motors can rotate within discreet increments of fractions of degrees.

The closely packed arrays keep the spacing between the axes of the optical fibers and the common axes as small as possible. While a displacement from the common axes is necessary to perform switching, minimizing the displacement is important since this minimization prevents misalignment with opposing optical fibers. As mentioned, with the closely packed alignment, a relatively large angular displacement translates into only a small circumferential displacement of the fiber axis.

FIGS. 5–7 show alternative embodiments of the present invention. In FIG. 5, first switch body 12 and second switch body 14 are provided with bore portions 16a" and 18a" which are sized large enough to receive seven optical fibers in the array shown in FIGS. 6 and 7.

First array 122 includes fibers 140–146. Second array 123 includes fibers 140'–146'. The axis of fiber 146 is coaxial with axis X—X of switch body 12. Similarly, the axis of fiber 146' is coaxial with axis Y—Y of switch body 14. Fibers 140–145 are circumferentially spaced about fiber 146 with the circumferentially positioned fibers 140–145 being in side-by-side abutting relation to contiguous fibers and to fiber 146. Fibers 141' through 146' are similarly arranged in an identical array. As a result, with the fibers so disposed in their respective arrays and with switch bodies 12 and 14 mounted in coaxial alignment, pairings of fibers 140–145 with fibers of 140'–145' may be selectively switched by rotatably adjusting switch body 12 relative to switch body 14. Fibers 146 and 146' are optically coupled regardless of the relative rotational position of switch bodies 12 and 14.

FIGS. 10–12 show an additional alternative embodiment. In FIG. 10, first switch body 12 and second switch body 14 are provided with bore portions 16b″ and 18b″ which are sized large enough for each of the bore portions to receive two optical fibers in the arrays shown in FIGS. 11 and 12.

First array 222 includes fibers 240 and 241. Second array 223 includes fibers 240′ and 241′. The fibers in the first and second arrays are disposed in closely-packed side-by-side abutting relation and fit snugly into the bore 16b′ and 18b″. In FIGS. 10–12, the fibers may be switched by rotating the bodies 12 and 14 relative to one another about axis X—X and Y—Y.

The embodiment of FIGS. 10–12 is particularly useful in that the switch is suitably adapted for an "A or B" or "ON/OFF" switch. For example, one of the fibers in array 222 (for example, fiber 241) may be a dummy fiber. That is, fiber 241 is not connected to any optical transmission system. Dummy fiber 241 is placed in bore 16b″ to urge fiber 240 against the surface of bore 16b″ so that the axis of fiber 240 is parallel to and spaced from the axis X—X. So constructed, the embodiment of FIG. 10 is an "A or B" switch such that fiber 240 may be alternatively optically coupled to fiber 240′ (the "A" fiber) or fiber 241′ (the "B" fiber) or possibly disconnected. Since fiber 241 is not connected to an optical transmission system, it does not convey as signal even if it is optically coupled to either of fibers 240′ or 241′.

Also using a dummy fiber in array 223 (for example, fiber 241′), the device of FIG. 10 is an "ON/OFF" switch. The switch is in the "ON" position when fibers 240 and 240′ are optically coupled. The switch is in the "OFF" position when fibers 240 and 240′ are not optically coupled.

The use of dummy fibers as described in the preceding paragraphs employs the dummy fibers as positioning means to hold the other fibers in their proper position in the desired array. Any positioning means other than dummy fibers could be used to urge the other fibers into their desired position. For example, as an alternative to dummy fibers, a non-optical fiber wire of suitable dimension or an adhesive or other plug could be used to urge the optical fibers into their desired position. The positioning means urges the active fiber (i.e. the fiber which is connected to the optical transmission system) against the bore wall. This keeps the axis of the fiber in proper alignment for switching. To achieve proper switching alignment, the bore of the switch bodies is as small as possible to receive the active fiber and the positioning means with the fiber held slightly off of the axis of the bore.

In the embodiment of FIGS. 10–12, two fibers are shown in each of bores 16b″ and 18b″. A very useful form of the embodiment of FIGS. 10–12 would have four fibers in each of bores 16b″ and 18b″. The four fibers would include two active fibers (i.e. two fibers which are connected to an optical transmission system) and two dummy fibers. In each opposing array, the dummy and active fibers are alternatively aligned in the array. Such an arrangement is an ON/OFF switch for two fiber pairs. As previously indicated, the dummy fibers can be replaced with nonoptical fiber wires or other positioning means.

The foregoing described the use of dummy fibers in the embodiment of FIGS. 10–12 and in a four fiber array. This description is illustrative. Dummy fibers (or other non-optical positioning means) could be used in the other embodiments of this application. For example, in the embodiment of FIGS. 5–6, all but one fiber (e.g. fiber 140) in array 122 could be dummy fibers or other positioning means. In the array of FIG. 123, fibers 140′–145′ could be optical transmitting fibers. This combination would result in a six position switch where, upon rotation, fiber 140 is optically coupled to any of fibers 140′–145′. To make a five position switch, any one of fibers 140′–145′ could be a dummy fiber.

FIGS. 13–15 show a "1-by-3" switch using a positioning means other than a dummy fiber. In this embodiment, a single optical fiber 340 is disposed within bore 16c″. The positioning means 341 urges the fiber 340 against the surface of the body 12 which defines bore 16c″. In this embodiment, the positioning means 341 is an elastomeric plug which holds fiber 340 against the wall of bore 16c″ and which holds the fiber 340 away from coaxial alignment with axis X—X. The elastomeric plug 341 fixes the position of fiber 340 against the wall of bore 16c″. (As an alternative to the elastomeric plug, the positioning means could be two dummy fibers. This structure would resemble FIG. 3 where fiber 40 would be active and fibers 41, 42 would be dummy fibers).

The array 323 of fibers in body 14 is identical to that in FIG. 4. Namely, three fibers 340′, 341′, 342′ are disposed in a triangular array. The three fibers 340′, 341′, 342′ abut in side-by-side relation with each of the three fibers cooperating to hold all three in fixed alignment with the fibers 340′, 341′, 342′ urged against the wall of bore 180″. Accordingly, any two of fibers 340′, 341′, 342′ act as the positioning means for the third of fibers 340′–342′. The completed arrangement is a "1-by-3" switch where fiber 340 may be optically coupled with any one of fibers 340′–342′. The arrangement of FIGS. 13–15 can be modified to be a "1-by-2" switch by simply making one of fibers 340′–342′ a dummy fiber (or replacing one of fibers 340′–342′ with an alternative positioning means).

From the foregoing detailed description of the present invention, it has been shown how the invention has been attained in a preferred manner, However, modifications and equivalents of the disclosed concepts such as readily occur to those skilled in the art are intended to be included in the scope of this invention. Thus the scope of the invention is intended to be limited only by the scope of the claims as are, or may hereafter be, appended hereto.

I claim:

1. An optical switch for a system including signals carried over a plurality of optical fibers, said switch comprising:
   a first plurality of signal transmitting optical fibers, each terminating at a terminal end;
   a second plurality of signal transmitting optical fibers, each terminating at a terminal end;
   said fibers of said first plurality being arranged in a closely packed bundle including a first array with terminal ends of said fibers disposed at least partially circumferentially about a common first axis;
   said fibers of said second plurality being arranged in a second array;
   aligning means for aligning said first array with said second array, and with said first array movable with respect to said second array to a plurality of angularly displaced positions about said first axis;
   said first and second arrays mutually configured so that at least one of said terminal ends of said fibers of said first plurality is optically coupled with a terminal end of at least one of said fibers of said second plurality when said first array is angularly displaced about said first axis in a first angularly displaced position and is not optically coupled with a fiber of said second array when said first array is disposed in another angularly displaced position.

2. An optical switch according to claim 1 wherein said fibers of said second plurality are disposed with terminal ends of said fibers of said second plurality positioned at least partially circumferentially about a common second axis and wherein said aligning means is selected to maintain said first axis in colinear alignment with said second axis.

3. An optical switch according to claim 1 wherein said fibers of said first array are disposed in side-by-side abutting relation.

4. An optical switch according to claim 3 wherein said fibers of said second array are disposed in side-by-side abutting relation.

5. An optical switch according to claim 3 comprising a switch body having a terminal face and a bore extending through said body and said face, said bore sized to have internal cross-sectional dimensions at said face approximate to a maximum cross-sectional external dimension of said first array, said fibers of said first plurality disposed within said bore in said closely packed array.

6. An optical switch according to claim 3 wherein said first array consists of three optical fibers with each of said optical fibers in side-by-side abutting relation with each other optical fiber, terminal ends of said fibers having axes cooperating to define a triangle with said common first axis disposed generally centrally within said triangle.

7. An optical switch according to claim 3 wherein said first array includes a central core extending generally colinearly with said common first axis, said plurality of optical fibers disposed about said core and in side-by-side abutting relation thereto.

8. An optical switch according to claim 7 wherein said core is an optical fiber.

9. An optical switch according to claim 3 wherein contiguous fibers of said first array are spaced apart by a distance less than three microns.

10. An optical switch according to claim 1 wherein contiguous fibers are spaced apart by equal angular displacement from said first axis.

11. An optical switch for a system including signals carried over a plurality of optical fibers, said switch comprising:
first plurality of signal transmitting optical fibers, each terminating at a terminal end;
a second plurality of signal transmitting optical fibers, each terminating at a terminal end;
a first switch body having a first terminal face and a first bore extending through said body at said face, said first plurality of fibers disposed within said first bore in side-by-side abutting relation in a bundle with terminal ends of said fibers arranged in a first array circumferentially about a common first axis at said first terminal face;
a second switch body having a second terminal face and a second bore extending through said body at said second terminal face, said second plurality of fibers disposed within said second bore in side-by-side abutting relation with terminal ends of said fibers arranged in a second array circumferentially about a common second axis at said second terminal face;
aligning means for aligning said first switch body with said second switch body and with said first and second axes aligned, and with said first body movable relative to said second body to a plurality of angularly displaced positions about said axes;
said first and second arrays mutually configured so that at least one of said terminal ends of said fibers of said first plurality is optically coupled with an opposing terminal end of a fiber of said second plurality when said first array is angularly displaced about said first axis in any of a plurality of angularly displaced positions, at least one of said fibers of said first array is optically coupled with different fibers of said second array when said first array is disposed in any one of at least two of said angularly displaced positions.

12. An optical switch according to claim 11 wherein said first and second switch bodies are generally cylindrical, each of said bodies having cylindrical axes generally colinear with said first and second axes, respectively, said aligning means including means for aligning said bodies with said first and second terminal faces in opposing relation and with said cylindrical axes colinearly aligned.

13. An optical switch according to claim 12 wherein said aligning means includes a sleeve sized to receive said first and second bodies and accommodating rotational movement of at least one of said bodies about its cylindrical axis.

14. An optical switch according to claim 11 comprising an index matching fluid disposed within a volume defined between opposing optical fibers.

15. An optical switch according to claim 11 comprising first mount means for mounting said first switch body and second mount means for mounting said second switch body, joint means for accommodating relative non-rotational movement of said first and second mount means while holding said aligning means with said switch bodies in axial alignment.

16. An optical switch according to claim 11 wherein said bores are sized to have an internal cross-sectional dimension at said terminal face approximate to a maximum cross-sectional external dimension of said arrays.

17. An optical switch according to claim 11 wherein at least one of said arrays consists of three optical fibers each abutting one another in side-by-side relation, terminal ends of said fibers having axis cooperating to define a triangle with a common axes disposed generally centrally within said triangle.

18. An optical switch according to claim 17 wherein contiguous fibers of said at least one of said arrays are paced apart by a distance less than three microns.

19. An optical switch according to claim 11 wherein at least one of said arrays includes a central core extending generally colinearly with a common axis of said array, said plurality of optical fibers disposed about said core and in side-by-side abutting relation thereto.

20. An optical switch according to claim 19 wherein said core is an optical fiber, 21. An optical switch according to claim 11 wherein contiguous fibers of said first and second array are equally displaced by a pre-determined angular displacement.

22. An optical switch comprising:
a first signal transmitting optical fiber terminating at a first terminal end;

a second signal transmitting optical fiber terminating at a second terminal end;

first body means having a first inner surface defining a first bore extending through said first terminal face;

second body means having a second inner surface defining a second bore extending through said second terminal face;

aligning means for aligning said first body means with said second body means in predetermined axial alignment with said first terminal face opposing said second terminal face and with said first and second bores disposed in generally coaxial alignment and cooperating to define a rotational axis for relative rotation of said first and second body means about axes of said first and second bores, said first and second body means rotatable relative to one another by rotation of at least one of said first and second body means about said rotational axis;

at least said first fiber disposed within said first bore against said first inner surface and with an axis of said first fiber spaced from said rotational axis;

at least said second fiber within said second bore against said second inner surface and with an axis of said second fiber spaced from said rotational axis;

said first and second optical fibers mutually spaced from said rotational axis for said fibers to be optically coupled when said first and second body means are rotated relative to one another to a predetermined position and discoupled when rotated from said position.

23. An optical switch according to claim 22 wherein said first fiber is disposed against said surface by an optical fiber within said bore and urging said first fiber against said bore.

24. An optical switch according to claim 23 wherein said first optical fiber is one of a first plurality of optical fibers, said fibers of said first plurality disposed within said first bore in side-by-side abutting relation.

25. An optical switch according to claim 22 wherein said second fiber is disposed against said surface by a fiber within said bore urging said second fiber against said surface.

26. An optical switch according to claim 24 wherein said second optical fiber is one of a second plurality of optical fibers, said fibers of said second plurality disposed within said second bore in side-by-side abutting relation.

27. An optical switch according to claim 22 wherein said first fiber is one of a first plurality of fibers, said fibers of said first plurality disposed urged against said first inner surface.

28. An optical switch according to claim 27 wherein said second fiber is one of a second plurality of fibers, said fibers of said second plurality disposed urged against said second inner surface.

29. An optical switch for a system including signals carried over a plurality of optical fibers, said switch comprising:

a first signal transmitting optical fiber disposed with a first terminal end thereof closely spaced from a predetermined first axis and with said first optical fiber rotatable about said first axis;

means for holding a second signal transmitting optical fiber;

aligning means for aligning said first fiber with said second fiber and with said first fiber rotatable about said axis between at least a first and second angularly displaced positions while accurately retaining said first terminal end in closely spaced relation to said first axis.

said first and second terminal ends cooperatively aligned to be optically coupled when said first fiber is angularly displaced about said first axis in said first angularly displaced position and said first and second terminal ends optically uncoupled when said first fiber is angularly displaced about said first axis in said second angularly displaced position.

30. An optical switch according to claim 29 wherein said second optical fiber is held with said second terminal end disposed closely spaced from a predetermined second axis, said aligning means selected to maintain said first axis in colinear alignment with said second axis.

* * * * *